(12) United States Patent
Saito et al.

(10) Patent No.: US 12,546,835 B2
(45) Date of Patent: Feb. 10, 2026

(54) FAILURE DETECTION DEVICE AND FAILURE DETECTION METHOD FOR ELECTRIC ACTUATOR FOR EMERGENCY STOP DEVICE

(71) Applicant: Hitachi, Ltd., Tokyo (JP)

(72) Inventors: Yuki Saito, Tokyo (JP); Akira Iwamoto, Tokyo (JP); Hiroki Matsuura, Tokyo (JP); Hiroyuki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 18/698,581

(22) PCT Filed: Oct. 7, 2021

(86) PCT No.: PCT/JP2021/037198
§ 371 (c)(1),
(2) Date: Apr. 4, 2024

(87) PCT Pub. No.: WO2023/058198
PCT Pub. Date: Apr. 13, 2023

(65) Prior Publication Data
US 2024/0426947 A1 Dec. 26, 2024

(51) Int. Cl.
*G01R 31/72* (2020.01)
*B66B 5/00* (2006.01)

(52) U.S. Cl.
CPC ............ *G01R 31/72* (2020.01); *B66B 5/0031* (2013.01)

(58) Field of Classification Search
CPC ......... G01R 31/72; B66B 5/0031; B66B 5/18; B66B 5/16
See application file for complete search history.

(56) References Cited

U.S. PATENT DOCUMENTS 11,225,397 B2 * 1/2022 Schulz ..................... B66B 1/32
2012/0000731 A1 1/2012 Schienda et al.
(Continued)

FOREIGN PATENT DOCUMENTS

CN 105329737 A 2/2016
JP 7-2441 A 1/1995
(Continued)

OTHER PUBLICATIONS

International Search Report (PCT/ISA/210) issued in PCT Application No. PCT/JP2021/037198 dated Dec. 14, 2021 (2 pages).
(Continued)

*Primary Examiner* — Christopher E Mahoney
(74) *Attorney, Agent, or Firm* — Crowell & Moring LLP (57) ABSTRACT

Provided is a failure detection device for an electric actuator for an emergency stop device that can improve maintainability of an electric device portion. The failure detection device for the electric actuator for the emergency stop device detects a failure of the electric actuator (10). The electric actuator actuates a drive mechanism that drives the elevator emergency stop device, and includes a movable element (34a, 34b, 34c) mechanically connected to the drive mechanism and a first electromagnet (35a) and a second electromagnet (35b) facing the movable element. The failure detection device includes: a position detector (109) configured to detect a position of the movable element; and a controller (103) configured to detect a failure of the electric actuator based on a position detection signal from the position detector. The controller issues a command to cut off energization of the first electromagnet during standby of the electric actuator, and then detects a failure of the second electromagnet based on the position detection signal.

8 Claims, 4 Drawing Sheets

(56) References Cited

U.S. PATENT DOCUMENTS

2024/0327167 A1\* 10/2024 Saito ............... B66B 5/0093
2025/0136411 A1\*  5/2025 Saito .................. B66B 5/18

FOREIGN PATENT DOCUMENTS

| JP | 2011-241018 A | 12/2011 |
| JP | 2012-520809 A | 9/2012 |
| JP | 2021-42013 A | 3/2021 |
| JP | 2021-130550 A | 9/2021 |
| WO | WO 2020/110316 A1 | 6/2020 |
| WO | WO 2021/166144 A1 | 8/2021 |

OTHER PUBLICATIONS

Japanese-language Written Opinion (PCT/ISA/237) issued in PCT Application No. PCT/JP2021/037198 dated Dec. 14, 2021 with English translation (5 pages).

\* cited by examiner

FAILURE DETECTION DEVICE AND FAILURE DETECTION METHOD FOR ELECTRIC ACTUATOR FOR EMERGENCY STOP DEVICE

TECHNICAL FIELD

The present invention relates to a failure detection device and a failure detection method for an electric actuator that actuates a drive mechanism that drives an elevator emergency stop device.

BACKGROUND ART

An elevator device includes a governor and an emergency stop device to constantly monitor an elevating speed of a car and emergency-stop the car in a prescribed overspeed state. Generally, the car and the governor are coupled by a governor rope. When the overspeed state is detected, the governor restricts the governor rope to operate the emergency stop device on a car side and emergency-stop the car.

In such an elevator device, the governor rope, which is elongated, is laid in a hoistway, making it difficult to save space and reduce cost. Further, when the governor rope swings, a structure in the hoistway is likely to interfere with the governor rope.

Given this, an emergency stop device that operates electrically without a governor rope is proposed. A technique related to such an emergency stop device in the related art is described in Patent Literature 1.

In the related art, a car is provided with a drive shaft that drives an emergency stop device and an electric actuator that actuates the drive shaft. The electric actuator includes a movable iron core mechanically connected to the drive shaft, and an electromagnet that attracts the movable iron core. The drive shaft is urged by a drive spring, however, during normal times, movement of the drive shaft is restricted by the electric actuator since the electromagnet is energized and the movable iron core is attracted.

In an emergency, the electromagnet is demagnetized to release the restriction of the drive shaft, and the drive shaft is driven by an urging force of the drive spring. As a result, the emergency stop device operates and the car emergency-stops.

When the emergency stop device is returned to a normal state, the electromagnet is moved and brought close to the movable iron core moved in an emergency. The electromagnet includes a feed nut that screws onto a feed screw shaft. When the feed screw shaft is rotated by a motor, the electromagnet moves toward the movable iron core. When the electromagnet comes into contact with the movable iron core, the movable iron core is attracted to the electromagnet. In a state in which the movable iron core is attracted to the electromagnet, the electromagnet is moved to return the movable iron core and the electromagnet to a normal standby position.

CITATION LIST

Patent Literature

Patent Literature 1: JP2021-130550A

SUMMARY OF INVENTION

Technical Problem

In maintenance of the emergency stop device in the related art, it is necessary to check presence or absence of an abnormality, a deterioration state, and the like not only in a mechanical part such as a braking element (wedge) but also in an electric device portion such as the electromagnet and the motor provided in the electric actuator. For this reason, the emergency stop device that operates electrically has a problem of improving maintainability of the electric device portion.

In view of the above, the invention provides a failure detection device and a failure detection method for an electric actuator for an emergency stop device, which can improve maintainability of an electric device portion.

Solution to Problem

To solve the above problem, there is provided a failure detection device for detecting a failure of an electric actuator for an emergency stop device according to the invention, the electric actuator configured to actuate a drive mechanism that drives an elevator emergency stop device and including a movable element mechanically connected to the drive mechanism and a first electromagnet and a second electromagnet facing the movable element, the failure detection device including: a position detector configured to detect a position of the movable element; and a controller configured to detect a failure of the electric actuator based on a position detection signal from the position detector, wherein the controller issues a command to cut off energization of the first electromagnet during standby of the electric actuator, and then detects a failure of the second electromagnet based on the position detection signal.

To solve the above problem, there is provided a failure detection method for detecting a failure of an electric actuator for an emergency stop device according to the invention, the electric actuator configured to actuate a drive mechanism that drives an elevator emergency stop device and including a movable element mechanically connected to the drive mechanism and a first electromagnet and a second electromagnet facing the movable element, the failure detection method including: cutting off energization of the first electromagnet during standby of the electric actuator; and detecting a failure of the second electromagnet based on a position of the movable element.

Advantageous Effects of Invention

According to the invention, a failure of an electromagnet part can be quickly and accurately detected. Accordingly, maintainability of an electric device portion in an emergency stop device that operates electrically is improved.

Problems, configurations, and effects other than those described above will become apparent in the following description of embodiments.

DESCRIPTION OF EMBODIMENTS

Hereinafter, an elevator device according to an embodiment of the invention will be described with reference to the drawings. In the drawings, components having the same reference numerals indicate the same components or components having similar functions.

Figure 1:
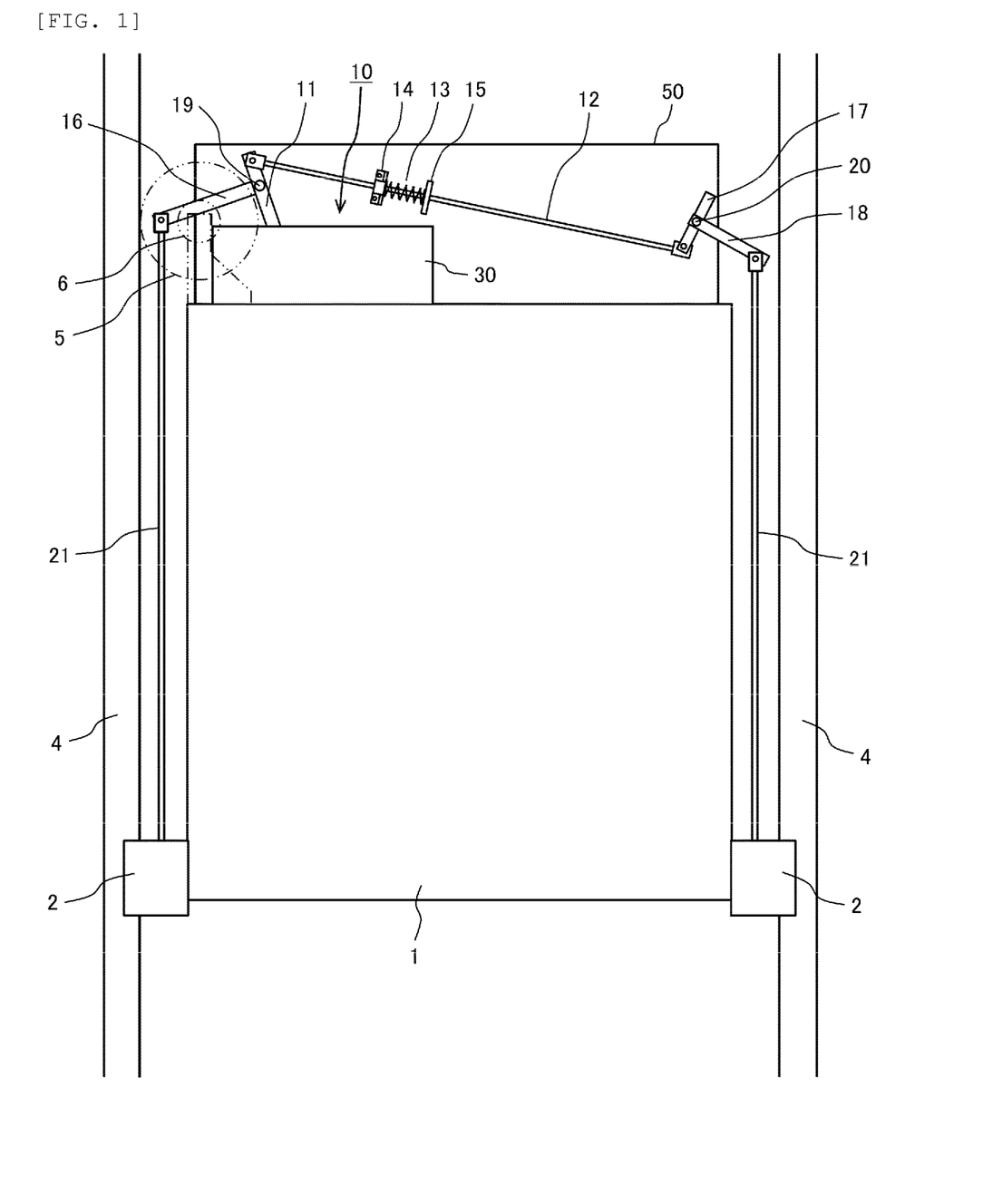
FIG. 1 is a schematic configuration diagram of an elevator device according to an embodiment.

FIG. 1 is a schematic configuration diagram of an elevator device according to the embodiment of the invention.

As shown in FIG. 1, the elevator device includes a car 1, a speed sensor (5 and 6), an electric actuator 10, a drive mechanism (12 to 20), pull-up rods 21, and emergency stop devices 2.

The car 1 is suspended by a main rope (not shown) in a hoistway provided in a building, and is slidably engaged with a guide rail 4 via a guide device. When the main rope is frictionally driven by a drive device (hoist: not shown), the car 1 is moved up and down in the hoistway.

The speed sensor in the present embodiment is provided on the car 1, and includes a rotary detector 6 and a roller 5 connected to a rotation shaft of the rotary detector 6. In the present embodiment, the roller 5 is connected to the rotation shaft of the rotary detector 6 such that a rotation shaft of the roller 5 and the rotation shaft of the rotary detector 6 are coaxial. For example, a rotary encoder can be applied as the rotary detector 6.

The roller 5 is in contact with the guide rail 4. For this reason, the roller 5 rotates when the car 1 moves up and down, and the rotary detector 6 rotates accordingly. A safety controller, which will be described later, monitors a traveling speed of the car 1 based on a rotational position signal output by the rotary detector 6 accompanying the rotation.

An image sensor may be used as the speed sensor. In this case, a position and a speed of the car 1 are detected based on image information on a surface state of the guide rail 4 acquired by the image sensor. For example, the speed is calculated from a movement distance of an image feature in prescribed time.

In the present embodiment, the electric actuator 10 is an electromagnetic operation device and is disposed on an upper portion of the car 1. The electromagnetic operation device includes, for example, a movable piece or a movable rod that operates by a solenoid or an electromagnet. The electric actuator 10 operates when the speed sensor (5, 6) detects a prescribed overspeed state of the car 1. At this time, the pull-up rod 21 is pulled up by the drive mechanism (12 to 20) mechanically connected to an operation lever 11. As a result, the emergency stop device 2 enters a braking state.

The drive mechanisms (12 to 20) will be described later.

One emergency stop device 2 is disposed on each of left and right sides of the car 1. A pair of braking elements (not shown) provided by each emergency stop device 2 are movable between a braking position and a non-braking position, and have the guide rail 4 sandwiched in the braking position. When the emergency stop device 2 moves up relative to the car 1 as the car 1 moves down, a braking force is generated by a frictional force acting between the braking elements and the guide rail 4. Accordingly, the emergency stop device 2 operates when the car 1 falls into an overspeed state, and emergency-stops the car 1.

The elevator device in the present embodiment includes a so-called low-press governor system that does not use a governor rope. When an elevating speed of the car 1 exceeds a rated speed and reaches a first overspeed (for example, a speed that does not exceed 1.3 times the rated speed), a power supply of the drive device (hoist) and a power supply of a control device that controls the drive device are cut off. When a descending speed of the car 1 reaches a second overspeed (for example, a speed that does not exceed 1.4 times the rated speed), the electric actuator 10 provided on the car 1 is electrically driven, the emergency stop device 2 is actuated, and the car 1 is emergency-stopped.

In the present embodiment, the low-press governor system includes the speed sensor (5, 6) and the safety controller that determines an overspeed state of the car 1 based on an output signal of the speed sensor. The safety controller measures the speed of the car 1 based on the output signal of the speed sensor. When determining that the measured speed reaches the first overspeed, the safety controller outputs a command signal for cutting off the power supply of the drive device (hoist) and the power supply of the control device that controls the drive device. When determining that the measured speed reaches the second overspeed, the safety controller outputs a command signal for actuating the electric actuator 10.

As described above, when the pair of braking elements provided in the emergency stop device 2 are pulled up by the pull-up rod 21, the pair of braking elements have the guide rail 4 sandwiched in between. The pull-up rod 21 is driven by the drive mechanism (12 to 20) connected to the electric actuator 10.

Hereinafter, a configuration of the drive mechanism will be described.

The operation lever 11 of the electric actuator 10 is coupled to a first actuating piece 16 to form a substantially T-shaped first link member. The operation lever 11 and the first actuating piece 16 respectively constitute a head portion and a foot portion of a T shape. The substantially T-shaped first link member is pivotably supported to a crosshead 50 via a first actuating shaft 19 at a coupling portion between the operation lever 11 and the first actuating piece 16. One of a pair of pull-up rods 21 (on a left side in the drawing) has an end portion connected to an end portion of the first actuating piece 16, which is the foot portion of the T shape, on a side opposite to the coupling portion between the operation lever 11 and the first actuating piece 16.

A connection piece 17 is coupled to a second actuating piece 18 to form a substantially T-shaped second link member. The connection piece 17 and the second actuating piece 18 respectively constitute a head portion and a foot portion of a T shape. The substantially T-shaped second link member is pivotably supported to the crosshead 50 via a second actuating shaft 20 at a coupling portion between the connection piece 17 and the second actuating piece 18. The other one of the pair of pull-up rods 21 (on a right side in the drawing) has an end portion connected to an end portion of the second actuating piece 18, which is the foot portion of the T shape, on a side opposite to the coupling portion between the connection piece 17 and the second actuating piece 18.

An end portion of the operation lever 11 that extends from inside to outside of a case 30 and one of two end portions of the connection piece 17 that is closer to the upper portion of the car 1 than the second actuating shaft 20 are respectively connected to one end (on the left side in the drawing) and the other end (on the right side in the drawing) of a drive shaft 12 lying across the car 1. The drive shaft 12 slidably penetrates a fixed portion 14 fixed to the crosshead 50. The drive shaft 12 further penetrates a pressing member 15. The pressing member 15 is fixed to the drive shaft 12. The pressing member 15 is located on a second link member (the connection piece 17 and the second actuating piece 18) side relative to the fixed portion 14. A drive spring 13, which is an elastic body, is located between the fixed portion 14 and the pressing member 15, and the drive shaft 12 is inserted through the drive spring 13.

When the electric actuator 10 operates, that is, when energization to an electromagnet in the present embodiment is cut off, an electromagnetic force that restricts movement of the operation lever 11 against an urging force of the drive spring 13 disappears. Accordingly, the drive shaft 12 is driven along a longitudinal direction by the urging force of the drive spring 13 applied to the pressing member 15. For this reason, the first link member (the operation lever 11 and the first actuating piece 16) pivots about the first actuating shaft 19, and the second link member (the connection piece 17 and the second actuating piece 18) pivots about the second actuating shaft 20. Accordingly, one pull-up rod 21 connected to the first actuating piece 16 of the first link member is driven and pulled up, and the other pull-up rod 21 connected to the second actuating piece 18 of the second link member is driven and pulled up at the same time.

Figure 2:
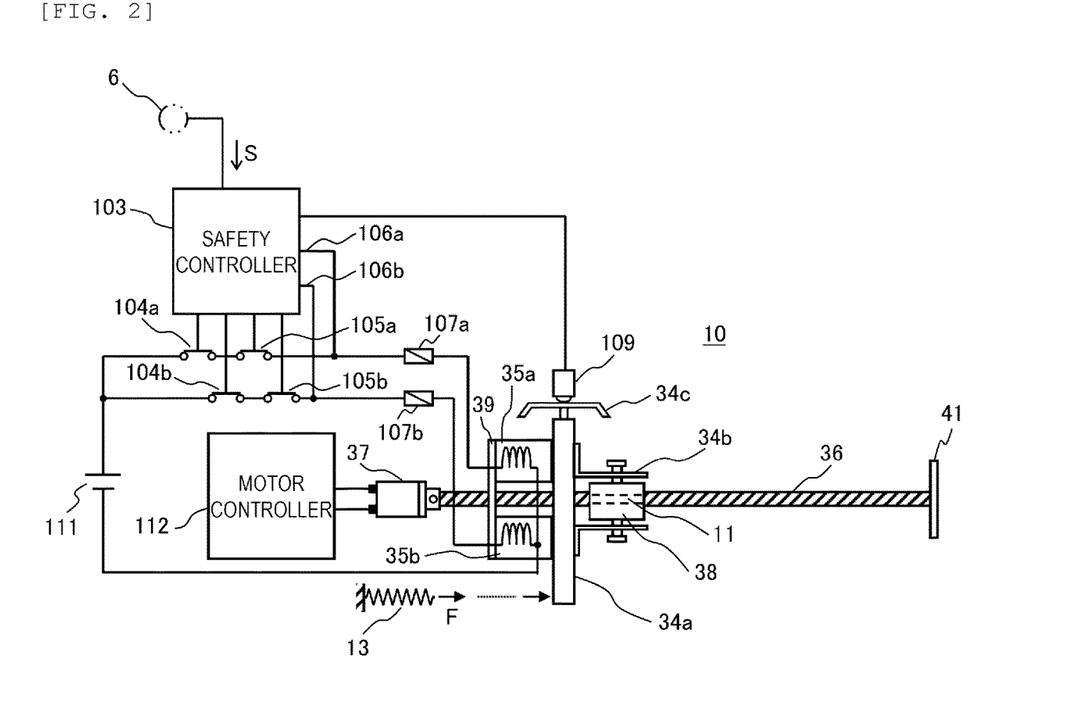
FIG. 2 is a plan view showing a mechanical part and an electric device portion of an electric actuator 10 (standby state).

FIG. 2 is a plan view showing a mechanical part and an electric device portion of the electric actuator 10 in the present embodiment in an installed state of FIG. 1. The electric actuator 10 shown in FIG. 2 is stored in the case 30 in FIG. 1 (the same applies to FIGS. 3 and 4).

Figure 3:
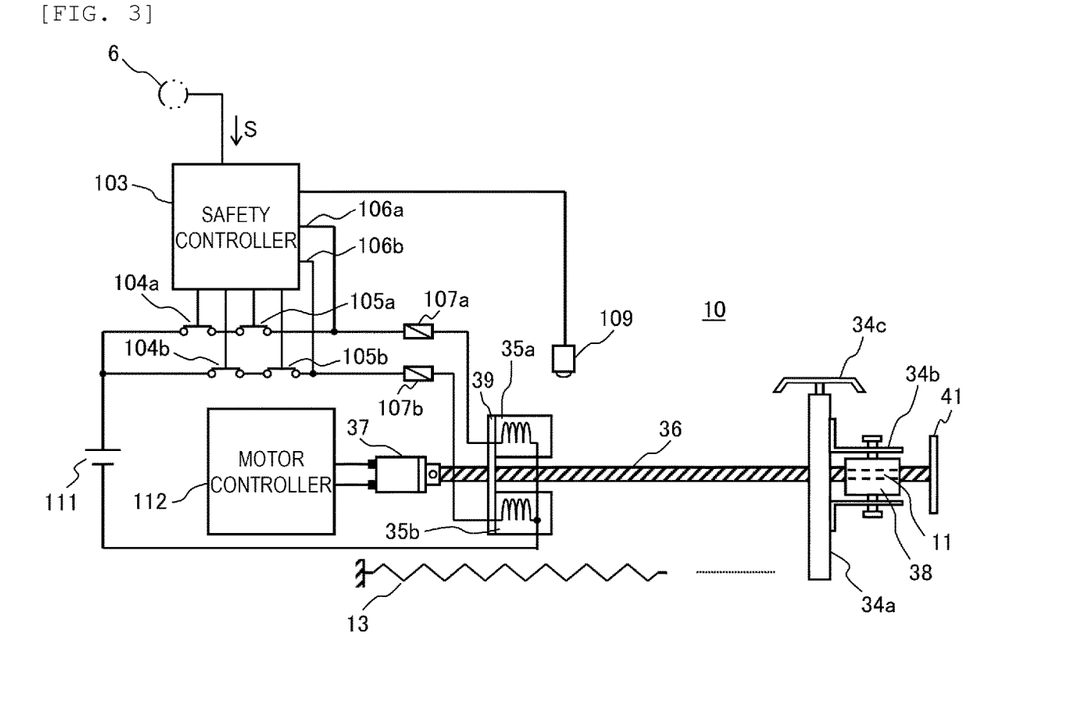
FIG. 3 is a plan view showing the mechanical part and the electric device portion of the electric actuator 10 (actuated state).
Figure 4:
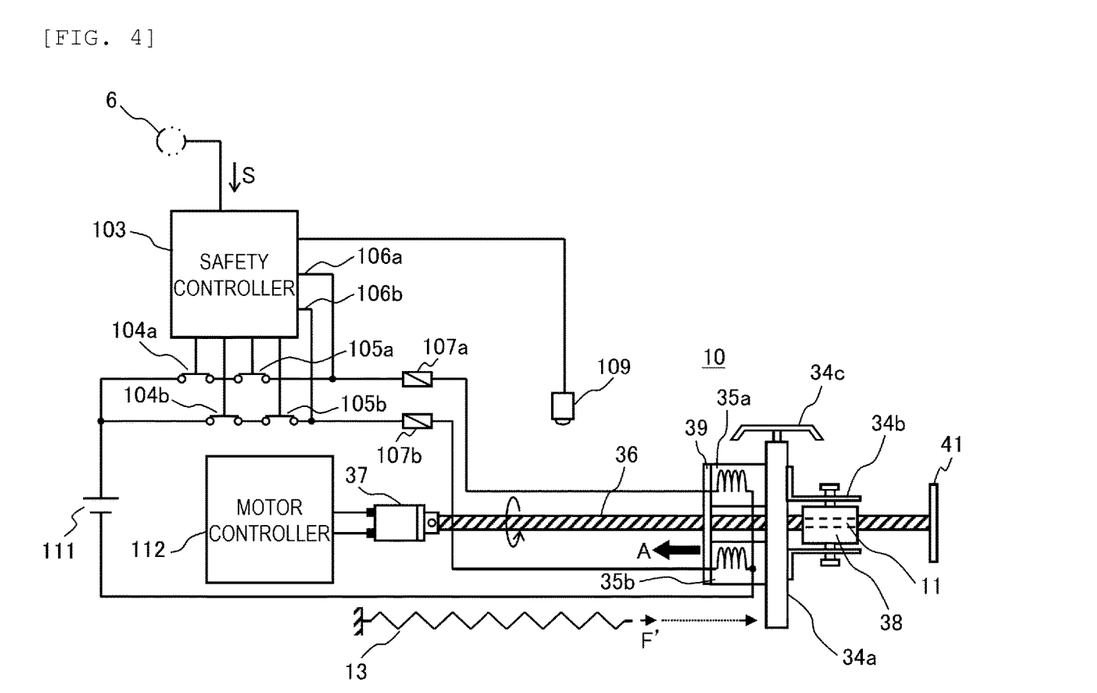
FIG. 4 is a plan view showing the mechanical part and the electric device portion of the electric actuator 10 (during return operation).

FIG. 2 also shows a circuit configuration for controlling the electric device portion (the same applies to FIGS. 3 and 4). In FIG. 2, the emergency stop device 2 (FIG. 1) is in a non-braking state, and the electric actuator 10 is in a standby state. That is, the elevator device is in a normal operation state.

As shown in FIG. 2, in the standby state, a movable element (34a, 34b, 34c), which is a movable member connected to the operation lever 11, is attracted by electromagnetic forces to electromagnets 35a and 35b whose coils are energized and excited. Accordingly, movement of the movable element is restricted against an urging force F of the drive spring 13 (FIG. 1) acting on the movable element via the drive shaft 12 (FIG. 1) and the operation lever 11. Accordingly, the electric actuator 10 restricts movement of the drive mechanism (12 to 20: FIG. 1) against the urging force of the drive spring 13.

The movable element includes an attraction portion 34a that is attracted to pole surfaces of the electromagnets 35a and 35b and a support portion 34b that is fixed to the attraction portion 34a and to which the operation lever 11 is connected. The operation lever 11 is pivotably connected to the support portion 34b of the movable element via a connection bracket 38. The electric actuator 10 is provided with a movable element detection switch 109 in a position in which the attraction portion 34a of the movable element is located during standby.

The movable element further includes a cam portion 34c fixed to the attraction portion 34a. When the movable element is located in a standby position, the movable element detection switch 109 is operated by the cam portion 34c. When operated by the cam portion 34c, the movable element detection switch 109 transitions from an on state to an off state or from the off state to the on state. Accordingly, it is possible to detect whether the movable element is located in the standby position according to a state of the movable element detection switch 109. In the present embodiment, a safety controller 103 determines whether the movable element is located in the standby position based on the state of the movable element detection switch 109.

In the movable element (34a, 34b, 34c) according to the present embodiment, at least the attraction portion 34a is made of a magnetic material. Soft magnetic materials such as low-carbon steel and permalloy (iron-nickel alloy) are preferably used as the magnetic material.

Other components of a mechanism portion (36, 37, 39, 41) shown in FIG. 2 will be described later.

The electromagnets 35a and 35b are excited by a DC power supply 111. In an excitation circuit of the electromagnet 35a, one end of the coil of the electromagnet 35a is connected to a high potential side of the DC power supply 111 via electrical contacts 104a, 105a and a fuse 107a connected in series, and the other end of the coil of the electromagnet 35a is connected to a low potential side of the DC power supply 111. In an excitation circuit of the electromagnet 35b, one end of the coil of the electromagnet 35b is connected to the high potential side of the DC power supply 111 via electrical contacts 104b, 105b and a fuse 107b connected in series, and the other end of the coil of the electromagnet 35b is connected to the low potential side of the DC power supply 111.

The fuses 107a, 107b are each provided in the excitation circuit to protect the electromagnets 35a and 35b from an overcurrent.

The electrical contacts 104a, 105a, 104b, and 105b are controlled to be on and off by the safety controller 103. In the standby state of the electric actuator 10, the safety controller 103 controls each of the electrical contacts 104a, 105a, 104b, and 105b to be in the on state. When the coils of the electromagnets 35a and 35b are energized, the electromagnets 35a and 35b generate electromagnetic forces.

Each of the electrical contacts 104a, 105a, 104b, and 105b is configured with a contact provided in, for example, an electromagnetic relay, an electromagnetic contactor, and an electromagnetic switch. In each excitation circuit of the electromagnets 35a and 35b, a plurality of (two in FIG. 2) electrical contacts are connected in series. Accordingly, even if an on failure occurs in one contact when the plurality of electrical contacts are controlled to be in the off state to actuate the emergency stop device 2 as to be described later, the energization of the electromagnet is cut off. Accordingly, operation reliability of the electric actuator 10 is improved. The on failure occurs due to, for example, welding of a contact.

In each excitation circuit, one electrical contact may be provided.

Figure 5:
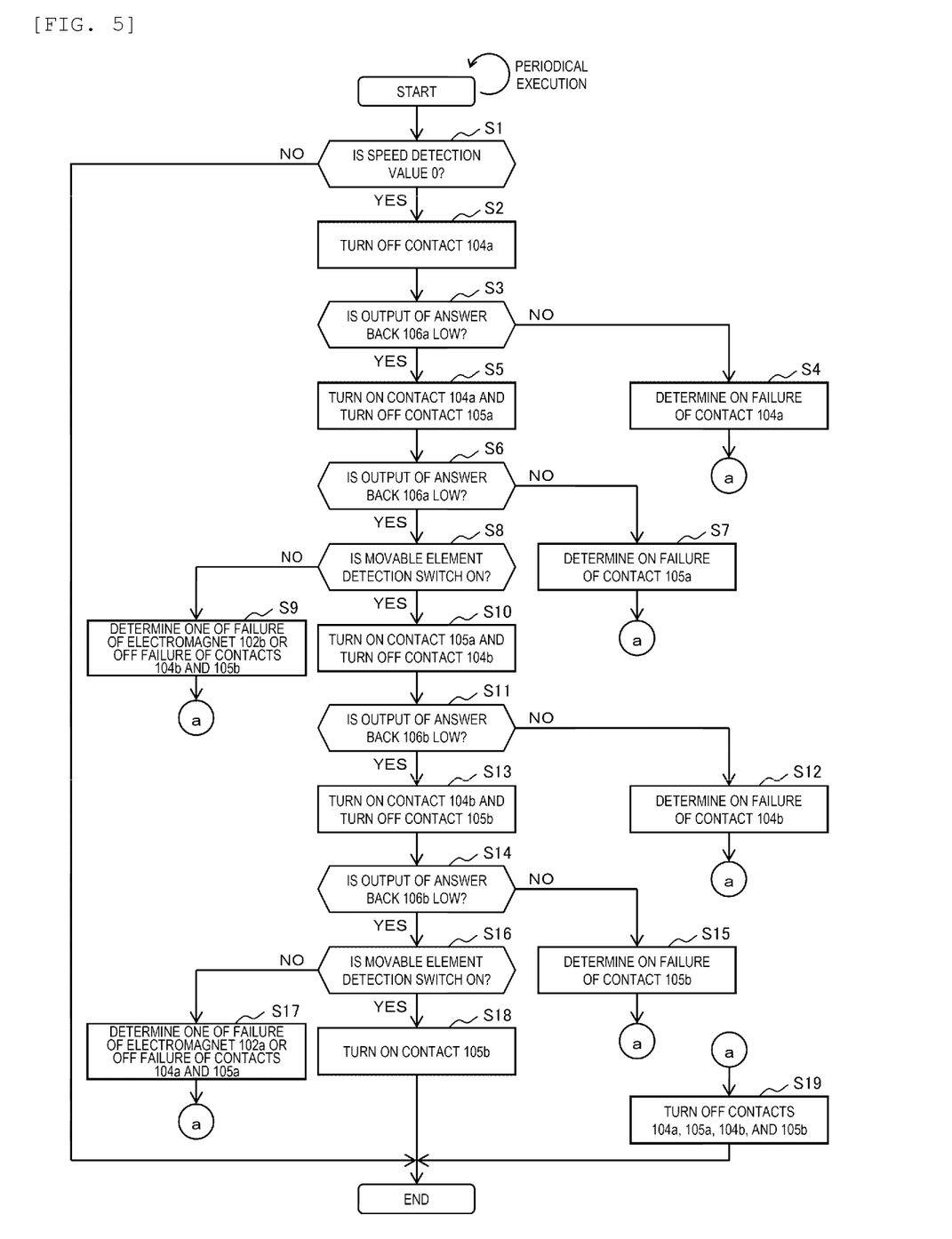
FIG. 5 is a flowchart showing a flow of a failure detection process of an electromagnet part according to the embodiment.

Other components of the electric device portion (37, 112) will be described later (FIGS. 3 and 4). Signal lines 106a and 106b are used to input an answer back signal to the safety controller 103 when a failure of the electromagnets 35a and 35b is detected. The answer back signal will be described later (FIG. 5).

FIG. 3 is a plan view showing the mechanical part and the electric device portion of the electric actuator 10 in the present embodiment in the installed state of FIG. 1. In FIG. 3, the emergency stop device 2 (FIG. 1) is in a braking state, and the electric actuator 10 is in an actuated state. That is, the elevator device is stopped by the emergency stop device 2.

When detecting a prescribed overspeed state (the above-described second overspeed) of the car 1 based on the rotational position signal from the rotary detector 6, the safety controller 103 outputs an off command to each of the electrical contacts 104a, 105a, 104b, and 105b. In response to the off command, the electrical contacts 104a, 105a, 104b, and 105b transition from the on state to the off state. For this reason, the excitation of the electromagnets 35a and 35b is stopped, and thus the electromagnetic forces acting on the movable element (34a, 34b, 34c) disappear. Accordingly, the restriction on the movable element by the attraction of the attraction portion 34a of the movable element to the electromagnets 35a and 35b is released, and thus the movable element moves in a direction (rightward direction in the drawing) of the urging force of the drive spring 13 from a position (FIG. 1) in the standby state by the urging force (F in FIG. 2) of the drive spring 13.

As the restriction on the movable element is released, the drive shaft 12 is driven by the urging force of the drive spring 13 (FIG. 1) acting on the pressing member 15 (FIG. 1) of the drive shaft 12 in a direction from the fixed portion 14 (FIG. 1) toward the pressing member (FIG. 1). When the drive shaft 12 is driven, the first link member (the operation lever 11 and the first actuating piece 16: FIG. 1) connected to the drive shaft 12 pivots about the first actuating shaft 19 (FIG. 1). Accordingly, the pull-up rod 21 (FIG. 1) connected to the first actuating piece 16 is pulled up. When the drive shaft 12 is driven, the second link member (the connection piece 17 and the second actuating piece 18: FIG. 1) connected to the drive shaft 12 pivots about the second actuating shaft 20 (FIG. 1). Accordingly, the pull-up rod 21 (FIG. 1) connected to the second actuating piece 18 is pulled up.

FIG. 4 is a plan view showing the mechanical part and the electric device portion of the electric actuator 10 in the present embodiment in the installed state of FIG. 1. In FIG. 4, the electric actuator 10 is in a return operation. The elevator device is in a recovery operation, and the emergency stop device 2 is released from the braking state.

To return the electric actuator 10 to the standby state as shown in FIG. 2, as described below, the movable element (34a, 34b, 34c) is returned from a movement position (FIG. 3) to the standby position (FIG. 2) by the mechanism portion (36, 37, 39, and 41) and the electric device portion (37 and 112) which are not described in FIG. 2.

As shown in FIG. 4, the electric actuator 10 includes a feed screw 36 that drives the movable element. The feed screw 36 is coaxially connected to a rotation shaft of a motor 37 and is rotatably supported by a support member 41. The electromagnets 35a and 35b are fixed to an electromagnet support plate 39 including a feed nut portion (not shown). The feed nut portion of the electromagnet support plate 39 is screwed with the feed screw 36. The feed screw 36 is rotated by the motor 37. Rotation of the motor 37 is controlled by a motor controller 112.

To return the electric actuator 10 to the standby state, first, the motor 37 is driven to rotate the feed screw 36. The rotation of the motor 37 is converted into linear movement of the electromagnets 35a and 35b along an axial direction of the feed screw 36 by the rotating feed screw 36 and the feed nut portion of the electromagnet support plate 39. Accordingly, the electromagnets 35a and 35b approach the movement position of the movable element (34a, 34b, 34c) shown in FIG. 3, and come into contact with the movable element as shown in FIG. 4.

The motor controller 112 monitors a motor current for controlling the motor 37. When the electromagnets 35a and 35b come into contact with the movable element as described above, a load of the motor 37 increases, and the motor current accordingly increases. When the motor current increases and exceeds a prescribed value, the motor controller 112 determines that the electromagnets 35a and 35b come into contact with the movable element. The motor controller 112 sends a determination result to the safety controller 103. Upon receiving the determination result from the motor controller 112, the safety controller 103 outputs an on command to each of the electrical contacts 104a, 105a, 104b, and 105b. In response to the on command, the electrical contacts 104a, 105a, 104b, and 105b transition from the off state to the on state. For this reason, the electromagnets 35a and 35b are excited.

The attraction portion 34a of the movable element is attracted to the electromagnets 35a and 35b by the electromagnetic forces of the excited electromagnets 35a and 35b. When the movable element is attracted to the electromagnets 35a and 35b, the motor controller 112 reverses a rotation direction of the motor 37 to rotate the feed screw 36 in a reverse direction. Accordingly, the movable element receives an urging force F' of the drive spring 13, and moves in a direction of an arrow A in FIG. 4, that is, toward the standby position, together with the electromagnets 35a and 35b.

When the movable element reaches the standby position, the movable element detection switch 109 is operated by the cam portion 34c of the movable element. When the movable element detection switch 109 is operated, the safety controller 103 determines that the movable element is located in the standby position. The safety controller 103 sends a determination result to the motor controller 112. Upon receiving the determination result, the motor controller 112 stops the rotation of the motor 37.

An output capacity of the motor 37 is set in consideration of a frictional force between the feed screw 36 and the feed nut portion caused by weights of the electromagnets 35a and 35b and the movable element, and the urging force of the drive spring 13.

In the present embodiment, each of the electromagnets 35a and 35b has an electromagnetic force sufficient to restrict the movement of the movable element against the urging force of the drive spring 13 even by one of the electromagnets 35a and 35b. Accordingly, even if one of the electromagnets 35a and 35b fails, the operation of the emergency stop device 2 can be maintained. This improves reliability of the operation of the electric actuator 10.

The operation of the electric actuator 10 described with reference to FIGS. 3 and 4 is the same even during a power failure.

Next, a method for detecting a failure of an electromagnet part provided in the electric actuator 10 will be described.

FIG. 5 is a flowchart showing a flow of a failure detection process of the electromagnet part according to the present embodiment.

The failure detection process according to the present embodiment is mainly executed by the safety controller 103 (FIG. 2). In the present embodiment, the safety controller 103 executes the failure detection process by executing a prescribed program by a computer system such as a microcomputer.

Hereinafter, FIG. 5 will be described with reference to FIG. 2 as appropriate. The failure detection process shown in FIG. 5 is periodically executed. The electric actuator 10 is in the standby state (FIG. 2).

When starting the process, first, in step S1, the safety controller 103 detects the speed of the car 1 based on a signal from the rotary detector 6 provided in the speed sensor, and further determines whether a speed detection value of the car 1 is zero. Here, the safety controller 103 determines whether the car 1 is stopped.

The safety controller 103 may determine whether the car 1 is stopped based on data related to an operation state of the car 1 acquired from an elevator control device that controls operation of the elevator device.

When determining that the speed detection value of the car 1 is not zero (NO in step S1), the safety controller 103 ends a series of processes. When determining that the speed detection value of the car 1 is zero (YES in step S1), the safety controller 103 executes step S2.

In step S2, the safety controller 103 sends an off command to the electrical contact 104*a* to turn off the electrical contact 104*a*. In FIG. 5, an "electrical contact" is referred to as a "contact".

After executing step S2, the safety controller 103 executes step S3.

In step S3, the safety controller 103 determines whether an output of an answer back (106*a*), that is, the answer back signal output from the signal line 106*a* to the safety controller 103 is LOW (low potential).

In step S3, the output of the answer back (106*a*) is a response signal of an excitation circuit of the electromagnet 35*a* in response to the off command to the electrical contact 104*a*. The response signal indicates a potential of one of two ends of the coil of the electromagnet 35*a* which is connected to the high potential side of the DC power supply 111 via the electrical contacts 104*a* and 105*a*. When the electrical contact 104*a* is normally turned off in response to the off command, the response signal, that is, the output of the answer back (106*a*) is equal to a potential of the other end of the coil connected to the low potential side of the DC power supply 111 and accordingly indicates LOW (low potential). When the electrical contact 104*a* is not normally turned off in response to the off command, that is, when the electrical contact 104*a* has an on failure, the response signal, that is, the output of the answer back (106*a*) indicates not LOW (low potential) but a potential (HIGH (high potential)) on the high potential side of the DC power supply 111.

In this manner, the safety controller 103 determines whether the electrical contact 104*a* is normal in step S3.

When determining in step S3 that the output of the answer back (106*a*) is LOW (low potential) (YES in step S3), the safety controller 103 executes step S5. When determining that the output is not LOW (low potential) (NO in step S3), the safety controller 103 executes step S4.

In step S4, the safety controller 103 determines that the electrical contact 104*a* has an on failure. After executing step S4, the safety controller 103 executes step S19 (described later) as indicated by a connector a in FIG. 5.

In step S5, the safety controller 103 sends an on command to the electrical contact 104*a* to turn on the electrical contact 104*a*, and sends an off command to the electrical contact 105*a* to turn off the electrical contact 105*a*. After executing step S5, the safety controller 103 executes step S6.

In step S6, similar to step S3, the safety controller 103 determines whether the output of the answer back (106*a*), that is, the answer back signal output from the signal line 106*a* to the safety controller 103 is LOW (low potential).

In step S6, the output of the answer back (106*a*) is a response signal of the excitation circuit of the electromagnet 35*a* in response to the off command to the electrical contact 105*a*. When the electrical contact 105*a* is normally turned off in response to the off command, the output of the answer back 106*a* indicates LOW (low potential). When the electrical contact 105*a* is not normally turned off in response to the off command, that is, when the electrical contact 105*a* has an on failure, the output of the answer back (106*a*) indicates not LOW (low potential) but a potential (HIGH (high potential)) on the high potential side of the DC power supply 111.

In this manner, the safety controller 103 determines whether the electrical contact 105*a* is normal in step S6.

When determining in step S6 that the output of the answer back (106*a*) is LOW (low potential) (YES in step S6), the safety controller 103 executes step S7. When determining that the output is not LOW (low potential) (NO in step S6), the safety controller 103 executes step S8.

In step S7, the safety controller 103 determines that the electrical contact 105*a* has an on failure. After executing step S7, the safety controller 103 executes step S19 (described later) as indicated by the connector a in FIG. 5.

In step S8, the safety controller 103 determines whether the movable element detection switch 109 is on. That is, the safety controller 103 determines whether the movable element (34*a*, 34*b*, 34*c*) is located in a prescribed standby position. Here, the movable element detection switch 109 is in an on state when operated by the cam portion 34*c* provided in the movable element.

When determining that the movable element detection switch 109 is on (YES in step S8), the safety controller 103 executes step S10. When determining that the movable element detection switch 109 is not on, that is, is off (NO in step S8), the safety controller 103 executes step S9.

In step S9, the safety controller 103 determines that the electromagnet 35*b* has a failure or one of the electrical contacts 104*b* and 105*b* has an off failure.

Since it is determined in step S8 that the movable element detection switch 109 is not on, the position of the movable element (34*a*, 34*b*, 34*c*) deviates from the prescribed standby position. This is because the electrical contact 105*a* is turned off in step S5 and the electromagnet 35*a* is not energized, and thus the electromagnetic force of the electromagnet 35*b* is reduced or the electromagnet 35*b* is not energized. Accordingly, it is determined that the electromagnet 35*b* has a failure or one of the electrical contacts 104*b* and 105*b* has an off failure.

After executing step S9, the safety controller 103 executes step S19 (described later) as indicated by the connector a in FIG. 5.

In the above-described steps S1 to S9, the safety controller 103 detects the failure of the electromagnet 35*b*, the on failure of the electrical contacts 104*a* and 105*a* in the excitation circuit of the electromagnet 35*a*, and the off failure of the electrical contacts 104*b* and 105*b* in the excitation circuit of the electromagnet 35*b*. Further, as described below, the safety controller 103 detects a failure of the electromagnet 35*a*, the on failure of the electrical contacts 104*b* and 105*b* in the excitation circuit of the electromagnet 35*b*, and the off failure of the electrical contacts 104*a* and 105*a* in the excitation circuit of the electromagnet 35*a* after step S10.

In step S10, the safety controller 103 sends an on command to the electrical contact 105*a* to turn on the electrical contact 105*a*, and sends an off command to the electrical contact 104*b* to turn off the electrical contact 104*b*. After executing step S10, the safety controller 103 executes step S11.

In step S11, the safety controller 103 determines whether the output of the answer back (106*b*), that is, the answer back signal output from the signal line 106*b* to the safety controller 103 is LOW (low potential).

In step S11, the output of the answer back (106*b*) is a response signal of the excitation circuit of the electromagnet 35*b* in response to the off command to the electrical contact 104*b*. The response signal indicates a potential of one of two ends of the coil of the electromagnet 35*b* which is connected to the high potential side of the DC power supply 111 via the electrical contacts 104*b* and 105*b*. When the electrical contact 104*b* is normally turned off in response to the off command, the response signal, that is, the output of the answer back (106b) is equal to a potential of the other end of the coil connected to the low potential side of the DC power supply 111 and accordingly indicates LOW (low potential). When the electrical contact 104b is not normally turned off in response to the off command, that is, when the electrical contact 104b has an on failure, the response signal, that is, the output of the answer back (106b) indicates not LOW (low potential) but a potential (HIGH (high potential)) on the high potential side of the DC power supply 111.

In this manner, the safety controller 103 determines whether the electrical contact 104b is normal in step S11.

When determining in step S11 that the output of the answer back (106b) is LOW (low potential) (YES in step S11), the safety controller 103 executes step S13. When determining that the output is not LOW (low potential) (NO in step S11), the safety controller 103 executes step S12.

In step S12, the safety controller 103 determines that the electrical contact 104b has an on failure. After executing step S12, the safety controller 103 executes step S19 (described later) as indicated by the connector a in FIG. 5.

In step S13, the safety controller 103 sends an on command to the electrical contact 104b to turn on the electrical contact 104b, and sends an off command to the electrical contact 105b to turn off the electrical contact 105b. After executing step S13, the safety controller 103 executes step S14.

In step S14, similar to step S11, the safety controller 103 determines whether the output of the answer back (106b), that is, the answer back signal output from the signal line 106b to the safety controller 103 is LOW (low potential).

In step S14, the output of the answer back (106b) is a response signal of the excitation circuit of the electromagnet 35b in response to the off command to the electrical contact 105b. When the electrical contact 105b is normally turned off in response to the off command, the output of the answer back 106b indicates LOW (low potential). When the electrical contact 105b is not normally turned off in response to the off command, that is, when the electrical contact 105b has an on failure, the output of the answer back (106b) indicates not LOW (low potential) but a potential (HIGH (high potential)) on the high potential side of the DC power supply 111.

As described above, safety controller 103 determines whether the electrical contact 105b is normal in step S14.

When determining in step S14 that the output of the answer back (106b) is LOW (low potential) (YES in step S14), the safety controller 103 executes step S16. When determining that the output is not LOW (low potential) (NO in step S14), the safety controller 103 executes step S15.

In step S15, the safety controller 103 determines that the electrical contact 105b has an on failure. After executing step S15, the safety controller 103 executes step S19 (described later) as indicated by the connector a in FIG. 5.

In step S16, the safety controller 103 determines whether the movable element detection switch 109 is on. That is, the safety controller 103 determines whether the movable element (34a, 34b, 34c) is located in the prescribed standby position. Here, the movable element detection switch 109 is in an on state when operated by the cam portion 34c provided in the movable element.

When determining that the movable element detection switch 109 is on (YES in step S16), the safety controller 103 executes step S18. When determining that the movable element detection switch 109 is not on, that is, is off (NO in step S16), the safety controller 103 executes step S17.

In step S17, the safety controller 103 determines that the electromagnet 35a has a failure or one of the electrical contacts 104a and 105a has an off failure.

Since it is determined in step S16 that the movable element detection switch 109 is not on, the position of the movable element (34a, 34b, 34c) deviates from the prescribed standby position. This is because the electrical contact 105b is turned off in step S13 and the electromagnet 35b is not energized, and the electromagnetic force of the electromagnet 35a is reduced or the electromagnet 35a is not energized. Accordingly, it is determined that the electromagnet 35a has a failure or one of the electrical contacts 104a and 105a has an off failure.

After executing step S17, the safety controller 103 executes step S19 (described later) as indicated by the connector a in FIG. 5.

In step S18, the safety controller S18 sends an on command to the electrical contact 105b to turn on the electrical contact 105b.

At a time point when step S18 is executed, it is determined that the electromagnets 35a and 35b and the electrical contacts 104a, 105a, 104b, and 105b have no failure, and thus in step S18, the electric actuator 10 is returned to the normal standby state by turning on the electrical contact 105b.

After executing step S18, the safety controller 103 ends the series of processes.

As described above, after executing one of steps S4, S7, S9, S12, S15, and S17, the safety controller 103 executes step S19.

In step S19, the safety controller 103 sends an off command to each of the electrical contacts 104a, 105a, 104b, and 105b. Accordingly, the energization of the electromagnets 35a and 35b is cut off.

At a time point when step S19 is executed, it is determined that one of the electromagnets 35a and 35b and the electrical contacts 104a, 105a, 104b, and 105b has a failure, and thus in step S19, the energization of the electromagnets 35a and 35b is cut off and the electric actuator 10 is brought into a rest state in preparation for maintenance work.

After executing step S19, the safety controller 103 ends the series of processes.

The invention is not limited to the above-described embodiment, and includes various modifications. For example, the embodiment described above is described in detail to facilitate understanding of the invention, and the invention is not necessarily limited to those including all configurations described above. Other configuration can be added to, deleted from, or replace a part of the configurations of the embodiment.

For example, the electric actuator 10 may be provided at a lower portion or a side portion in addition to the upper portion of the car 1.

The elevator device may further include a machine room or may be a so-called machine room-less elevator having no machine room.

REFERENCE SIGNS LIST

1: car
2: emergency stop device
3: position sensor
4: guide rail
5: roller
6: rotary detector
10: electric actuator
11: operation lever 12: drive shaft
13: drive spring
14: fixed portion
15: pressing member
16: first actuating piece
17: connection piece
18: second actuating piece
19: first actuating shaft
20: second actuating shaft
21: pull-up rod
30: case
34a: attraction portion
34b: support portion
34c: cam portion
35a, 35b: electromagnet
36: feed screw
37: motor
38: connection bracket
39: electromagnet support plate
41: support member
50: crosshead
103: safety controller
104a, 105a, 104b, 105b: electrical contact
106a, 106b: signal line
107a, 107b: fuse
109: movable element detection switch
111: DC power supply
112: motor controller

The invention claimed is:

1. A failure detection device for detecting a failure of an electric actuator for an emergency stop device, the electric actuator configured to actuate a drive mechanism that drives an elevator emergency stop device and including a movable element mechanically connected to the drive mechanism and first a electromagnet and a second electromagnet facing the movable element, the failure detection device comprising:
a position detector configured to detect a position of the movable element; and
a controller configured to detect the failure of the electric actuator based on a position detection signal from the position detector, wherein
the controller issues a command to cut off energization of the first electromagnet during standby of the electric actuator, and then detects a failure of the second electromagnet based on the position detection signal.

2. The failure detection device for the electric actuator for the emergency stop device according to claim 1, wherein when determining that the movable element is not located in a standby position based on the position detection signal, the controller determines a failure of the second electromagnet.

3. The failure detection device for the electric actuator for the emergency stop device according to claim 2, wherein the position detector is provided in the standby position of the movable element.

4. The failure detection device for the electric actuator for the emergency stop device according to claim 3, wherein the position detector includes a position detection switch, and
the position detection switch is operated by a cam portion of the movable element.

5. The failure detection device for the electric actuator for the emergency stop device according to claim 1, wherein the controller detects a failure of an electrical contact in an excitation circuit of the first electromagnet based on an answer back signal from the excitation circuit of the first electromagnet in response to the command from the controller to cut off the energization of the first electromagnet.

6. The failure detection device for the electric actuator for the emergency stop device according to claim 5, wherein in the excitation circuit, one end of a coil of the first electromagnet is connected to a high potential side of a DC power supply via the electrical contact, the other end of the coil is connected to a low potential side of the DC power supply, and
the answer back signal indicates a potential of the one end of the coil.

7. A failure detection method for detecting a failure of an electric actuator for an emergency stop device, the electric actuator configured to actuate a drive mechanism that drives an elevator emergency stop device and including a movable element mechanically connected to the drive mechanism and a first electromagnet and a second electromagnet facing the movable element, the failure detection method comprising:
cutting off energization of the first electromagnet during standby of the electric actuator; and
detecting a failure of the second electromagnet based on a position of the movable element.

8. The failure detection method for the electric actuator for the emergency stop device according to claim 7, wherein when the position of the movable element deviates from a standby position, the failure of the second electromagnet is determined.

* * * * *